(12) United States Patent
Jolly

(10) Patent No.: US 8,899,432 B2
(45) Date of Patent: Dec. 2, 2014

(54) LOAD DISPERSING MEMBER FOR WHILE-IN-USE ELECTRICAL BOX COVER

(71) Applicant: Thomas & Betts International, Inc., Wilmington, DE (US)

(72) Inventor: Robert Kevin Jolly, Cordova, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 13/723,641

(22) Filed: Dec. 21, 2012

(65) Prior Publication Data

US 2013/0228569 A1    Sep. 5, 2013

Related U.S. Application Data

(60) Provisional application No. 61/605,344, filed on Mar. 1, 2012.

(51) Int. Cl.
*H05K 5/03* (2006.01)

(52) U.S. Cl.
USPC .............................. 220/3.8; 220/831; 220/832

(58) Field of Classification Search
CPC ........... H02G 3/08; H02G 3/081; H02G 3/14; H01H 9/02; H05K 5/03
USPC .......................................... 220/3.8, 831, 832
See application file for complete search history.

(56) References Cited

U.S. PATENT DOCUMENTS

| | | | |
|---|---|---|---|
| 3,221,919 A * | 12/1965 | Gessner ........................ 220/832 |
| 4,134,516 A | 1/1979 | Sullo | |
| 4,197,959 A | 4/1980 | Kramer | |
| 4,615,464 A * | 10/1986 | Byrns ........................... 220/4.23 |
| 4,967,924 A * | 11/1990 | Murofushi et al. ............ 220/3.8 |
| 5,228,584 A | 7/1993 | Williams, Jr. | |
| 5,280,135 A | 1/1994 | Berlin et al. | |
| 5,317,108 A | 5/1994 | Prairie, Jr. | |
| 5,430,253 A * | 7/1995 | Pratt ............................... 174/67 |
| 5,456,377 A | 10/1995 | Williams, Jr. | |
| 5,533,637 A | 7/1996 | Williams, Jr. | |
| D486,452 S | 2/2004 | Dinh | |
| 6,737,576 B1 | 5/2004 | Dinh | |
| 6,891,104 B2 | 5/2005 | Dinh | |
| 7,225,506 B2 | 6/2007 | Tiao | |
| 7,241,952 B2 | 7/2007 | Dinh | |
| 7,374,058 B2 | 5/2008 | Dinh et al. | |
| 7,378,591 B2 | 5/2008 | Dinh | |
| 7,410,372 B2 | 8/2008 | Johnson et al. | |
| 7,462,777 B2 | 12/2008 | Dinh | |
| 7,476,806 B2 | 1/2009 | Dinh | |

(Continued)

*Primary Examiner* — Stephen Castellano
(74) *Attorney, Agent, or Firm* — Snyder, Clark, Lesch & Chung, LLP

(57) ABSTRACT

A while-in-use electrical box cover includes a base and a hood. The base has a box-like structure and an open front face and includes a base hinge mount. The hood has a front wall for covering the open front face of the base and includes a hood hinge mount. A hinge pin joins the base hinge mount and the hood hinge mount in a pivoting configuration. An accepting member including a first contact surface extends from the base hinge mount. A load dispersing member included on the hood has a second contact surface configured to engage the first contact surface when the hood pivots to a fully open position. Engagement of the first contact surface and the second contact surface creates a stress in the hood, and the load dispersing member disperses the stress away from the hood hinge mount.

19 Claims, 7 Drawing Sheets

(56) References Cited

U.S. PATENT DOCUMENTS

| | | |
|---|---|---|
| 7,511,219 B2 | 3/2009 | Dinh et al. |
| 7,598,454 B1 | 10/2009 | Baldwin et al. |
| 7,626,121 B1 | 12/2009 | Cleghorn |
| 7,763,799 B2 | 7/2010 | Johnson |
| 7,935,889 B1 | 5/2011 | Cleghorn |
| 7,999,419 B2 | 8/2011 | Drane et al. |
| 8,017,865 B1 * | 9/2011 | Baldwin .................... 174/66 |
| 2008/0011503 A1 | 1/2008 | Dinh |
| 2009/0303666 A1 * | 12/2009 | Brizes et al. .............. 361/658 |
| 2010/0051313 A1 | 3/2010 | Dinh et al. |
| 2010/0147547 A1 | 6/2010 | Drane et al. |
| 2010/0181091 A1 | 7/2010 | Drane |

* cited by examiner

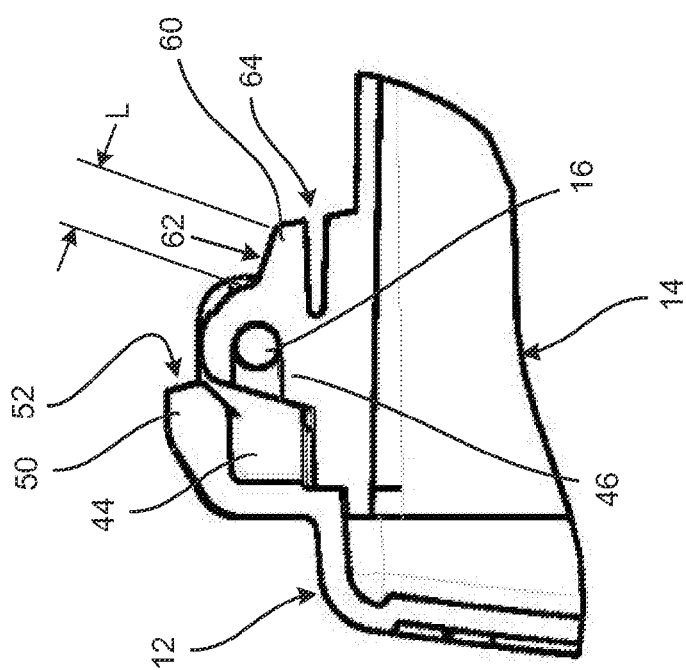

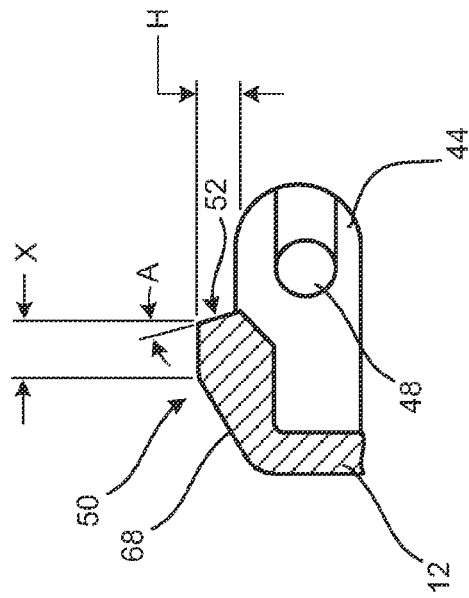
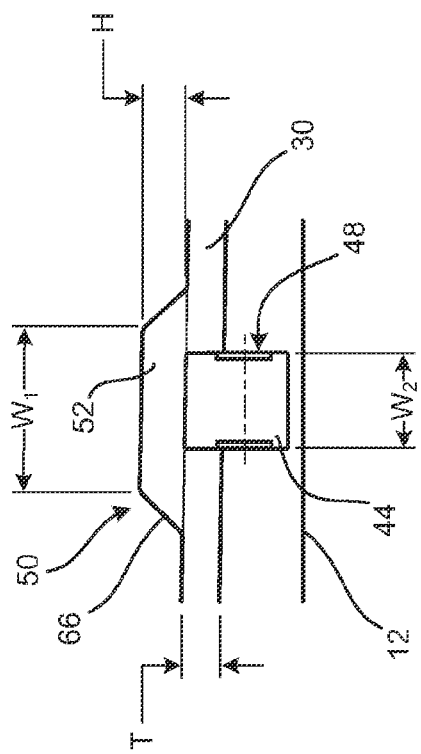
FIG. 5B
FIG. 5A

US 8,899,432 B2

LOAD DISPERSING MEMBER FOR WHILE-IN-USE ELECTRICAL BOX COVER

CROSS-REFERENCE TO RELATED APPLICATION

This application claims priority under 35 U.S.C. §119, based on U.S. Provisional Patent Application No. 61/605,344, filed Mar. 1, 2012, the disclosure of which is hereby incorporated by reference herein.

BACKGROUND INFORMATION

While-in-use covers are well known in the industry and are used to provide an enclosed housing for electrical devices such as electrical receptacles, ground fault circuit interrupters (GFCI), pushbuttons and switches. While-in-use covers can be installed over electrical devices without having to turn off the device and disconnect the wiring. This makes while-in-use covers convenient and easy to use. The purpose of the cover is primarily to protect the electrical device from dust, water, and other foreign materials. It is of particular importance to prevent rain water from contacting the electrical device in order to reduce the risk of short circuits, fire, and damage to the device and the electrical system connected to it.

The National Electrical Code (NEC) provides standards for while-in-use electrical box covers. These standards recognize that most residential in-use receptacle covers are not suitable for commercial and industrial usage. While-in-use covers for commercial and industrial applications must conform to more stringent extra-duty standards.

BRIEF DESCRIPTION OF THE DRAWINGS

FIG. 3B provides an enlarged side view of the cutaway portion of FIG. 3A;

FIGS. 5A and 5B provide a rear view and a cross-sectional view of a section of the hood of FIG. 1 including a load dispersing member.

DETAILED DESCRIPTION OF PREFERRED EMBODIMENTS

The following detailed description refers to the accompanying drawings. The same reference numbers in different drawings may identify the same or similar elements.

According to implementations described herein, a while-in-use cover for an electrical box may include a base and a hood joined with a hinge for opening and closing the hood. The base may have a box-like structure and an open front face and may include a base hinge mount. The hood may have a front wall for covering the open front face of the base and may include a hood hinge mount. A hinge pin may join the base hinge mount and die hood hinge mount in a pivoting configuration. An accepting member including a first contact surface may extend from the base hinge mount. A load dispersing member included on the hood may have a second contact surface configured to engage the first contact surface when the hood pivots to a fully open position. Engagement of the first contact surface and the second contact surface creates a stress in the hood. The first contact surface and the second contact surface may meet in a flush orientation to prevent a knife-edge contact, and the load dispersing member may disperse the stress away from the hood hinge mount.

Figure 1:
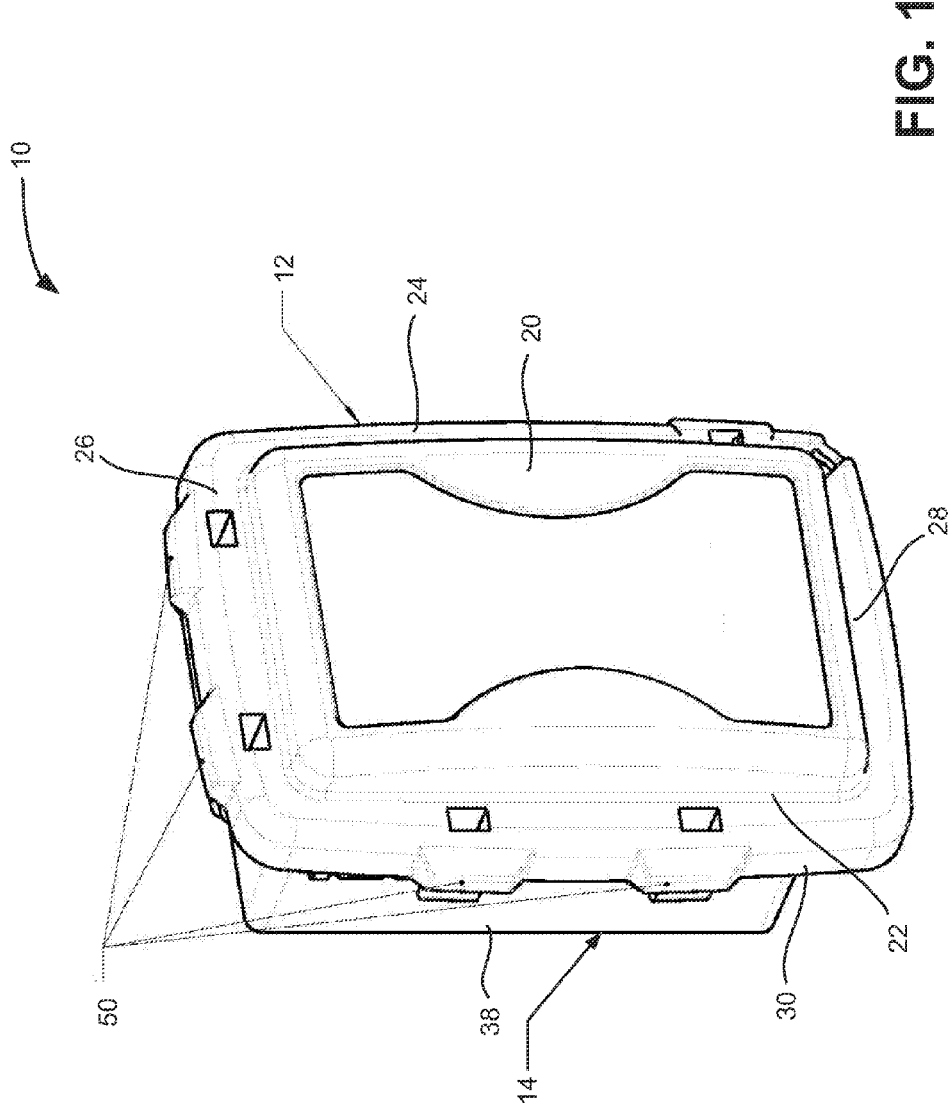
FIG. 1 provides a front perspective view of a while-in-use electrical box cover according to an implementation described herein.
Figure 2:
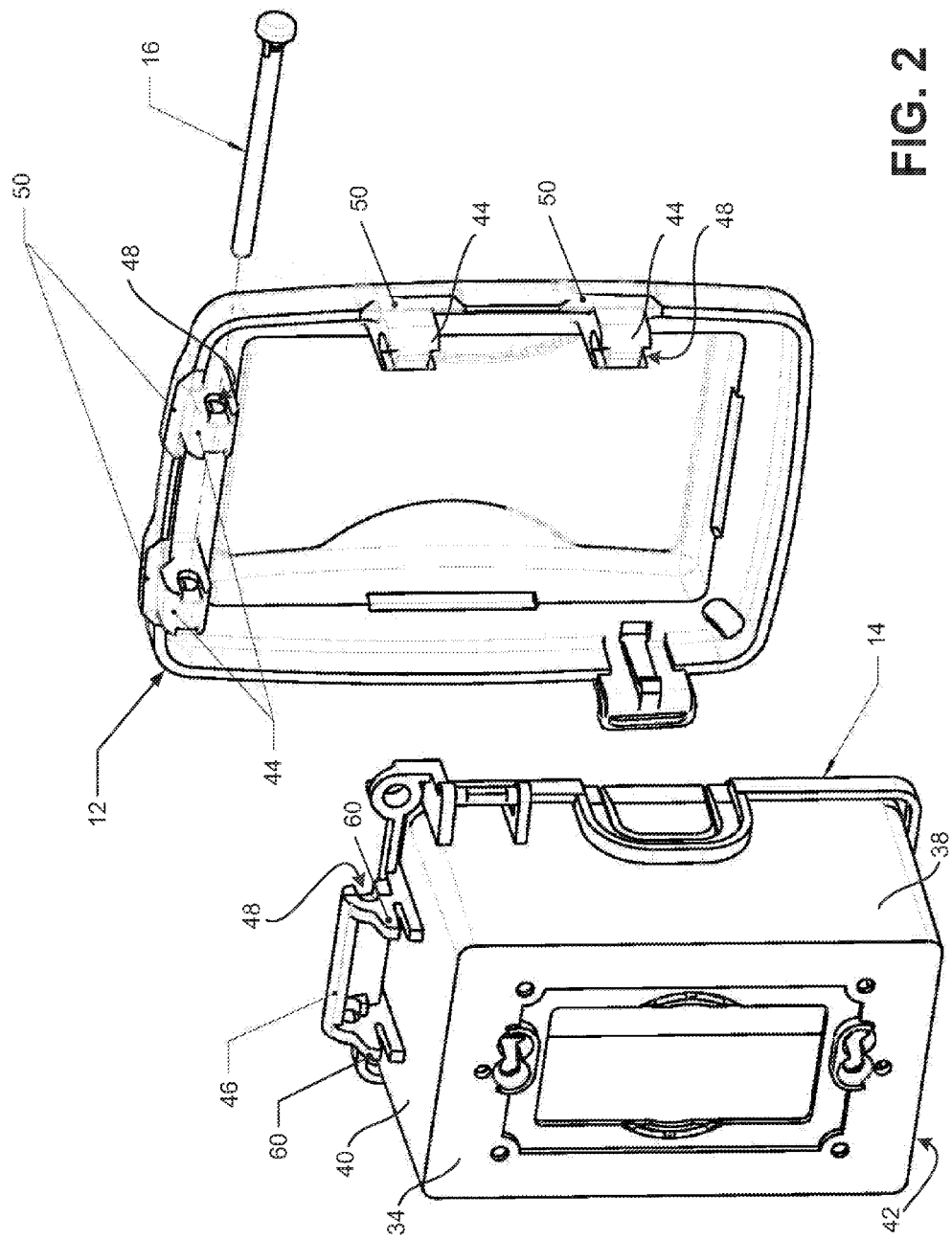
FIG. 2 provides an exploded rear perspective view of the while-in-use cover of FIG. 1.

FIG. 1 provides a front perspective view, and FIG. 2 provides an exploded rear perspective view, of a while-in-use electrical box cover according to an implementation described herein. Referring collectively to FIGS. 1 and 2, an electrical box cover 10 may include a hood 12, a base 14, and a hinge pin 16. The electrical box cover 10 is configured with hood 12 being mateable with base 14 via a cooperative mating assembly formed at separate locations thereon.

Hood 12 may have a substantially flat, rectangular front wall 20 and hood side walls 22, 24, 26, and 28 around the perimeter of front wall 20 that extend downwardly from front wall 20 and terminate in an edge 30 (e.g., a flanged edge) to form the box-like structure with an open face. Base 14 may have a substantially flat, rectangular back wall 34 with an opening for accessing an electrical outlet and side walls 36 (not visible in FIGS. 1 and 2), 38, 40, and 42 around the perimeter of back wall 34, that form a box-like structure with an open front face 32 (see FIG. 3A). The dimensions of the box-like structure are selected so that, when hood 12 is positioned over base 14, flanged edge 30 of the hood 12 partially extends over side walls 36, 38, 40, 42 at open front face 32 of base 14. Hood 12 and base 14 may be made from a variety of plastic or metal materials. In one implementation, hood 12 and base 14 may be made from one or more polycarbonate materials.

Side wall 40 of base 14 and side wall 26 of hood 12 may each contain a pivot location for pivotally attaching hood 12 and base 14. The pivot locations may include a cooperative mating assembly integrally molded into hood 12 and base 14 respectively. The cooperative mating assembly provided may include a top mating pair including hood hinge mounts 44 and a base hinge mount 46. Hood hinge mounts 44 and a base hinge mount 46 may each include hinge apertures 48 configured to receive hinge pin 16. In one implementation, the top mating pair may be configured to fully encircle hinge pin 16, adding strength to the pivot location and preventing hood 12 and base 14 from separating. In one implementation, another pivot location may be included at side wall 38 of based 14 and side wall 22 of hood 12. For example, a side mating pair may include hood hinge mounts 44 adjacent to side wall 22 and another base hinge mount 46 adjacent to side wall 36 (FIG. 3A).

Hinge pin 16, may be a separate component from hood 12 and base 14. Hinge pin 16 may generally include a cylindrical stem having a chamfered end at one end and a head at the other end of hinge pin 16. Hinge pin 16 may be configured to be axially inserted into hinge apertures 48 of the mating assembly including hood hinge mounts 44 and base hinge mounts 46. Hinge pin 16 may be made from a plastic or metal material. In one implementation, hinge pin 16 may be made of the same material as one or both of hood 12 and base 14. In other implementations, hinge pin 16 may be made from a different material than hood 12 and base 14. In an exemplary implementation, hinge pin 16 may be made of nylon 6-6.

Electrical box cover 10 generally requires hood 12 to be pivoted into an open position to allow access to the interior of the enclosure. High stresses may occur around the hinges, and particularly in the area of hood hinge mounts 44 as the hood is opened to its fullest extent. In conventional while-in-use covers, these high stresses may lead to damage and failure which can leave the product unusable. In implementations described herein, a load dispersing member 50 is included at each hinge area of hood 12, and corresponding accepting members 60 are included on base hinge mounts 46 of base plate 14, in order to reduce the high stresses by distributing or dispersing the high concentration of these stresses that occur at the hinge areas due to extremely high torque loads. More particularly, load dispersing members 50 may be included adjacent to each of hood hinge mounts 44 along edge 30. In another implementation dispersing members 50 may include a continuous single member that extends generally adjacent to the span of base hinge mount 46. In still another implementation, load dispersing member 50 may be located along edge 30, or elsewhere on hood 12, in a location that is not adjacent to one of hinge mounts 44. For example, accepting member 60 and load dispersing member 50 may be co-located along a different place along the hinge area.

Figure 3A:
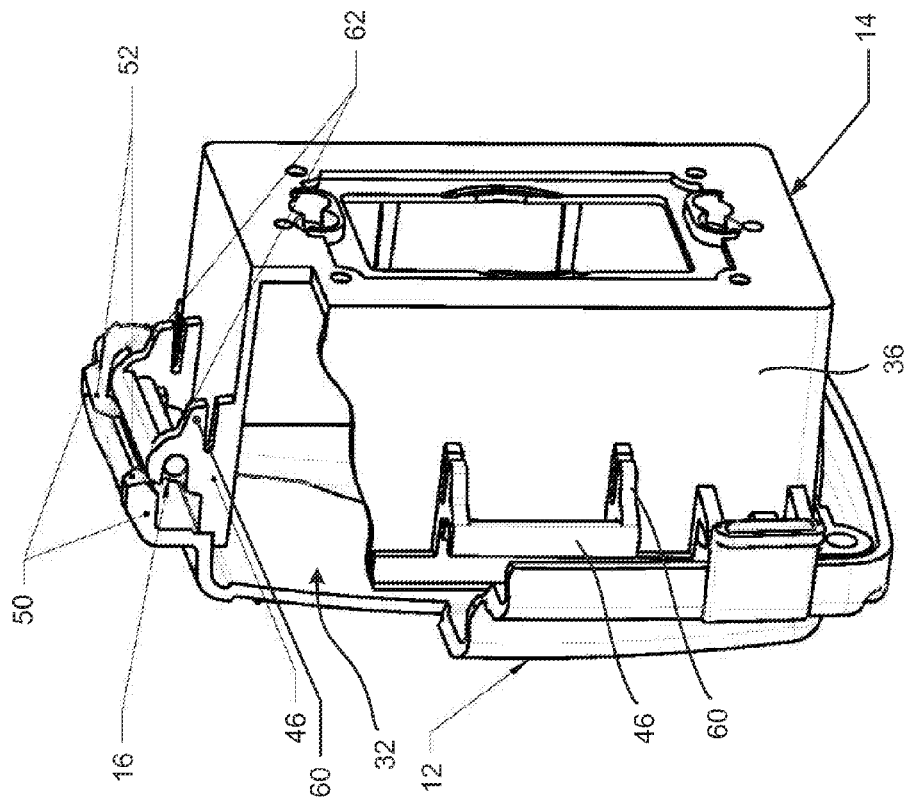
FIG. 3A provides a cutaway perspective view of the while-in-use cover of FIG. 1 in a closed orientation.

FIG. 3A provides a cutaway perspective view of electrical box cover 10 in a closed orientation. FIG. 3B provides an enlarged side view of the cutaway view of FIG. 3A. As shown in FIGS. 3A and 3B, load dispersing member 50 on hood 12 may include a contact surface 52, and accepting members 60 on base 14 may include a contact surface 62. Accepting member 60 may be connected to base hinge mount 46 in a manner that provides contact surface 62 on an upper side and may include a V-shaped spring buffer 64 to cushion the impact of contact surface 52 on contact surface 62 during opening of hood 12. Accepting member 60 may be of sufficient length, L, to allow contact surface 52 to engage contact surface 62 along the full height (shown in FIG. 4B) of contact surface 52. In one implementation, accepting member 60 may include a standard width, equal to that of a portion of hood hinge mount 44. For example, in one implementation, accepting member 60 may be one-eighth inch wide.

Figure 4A:
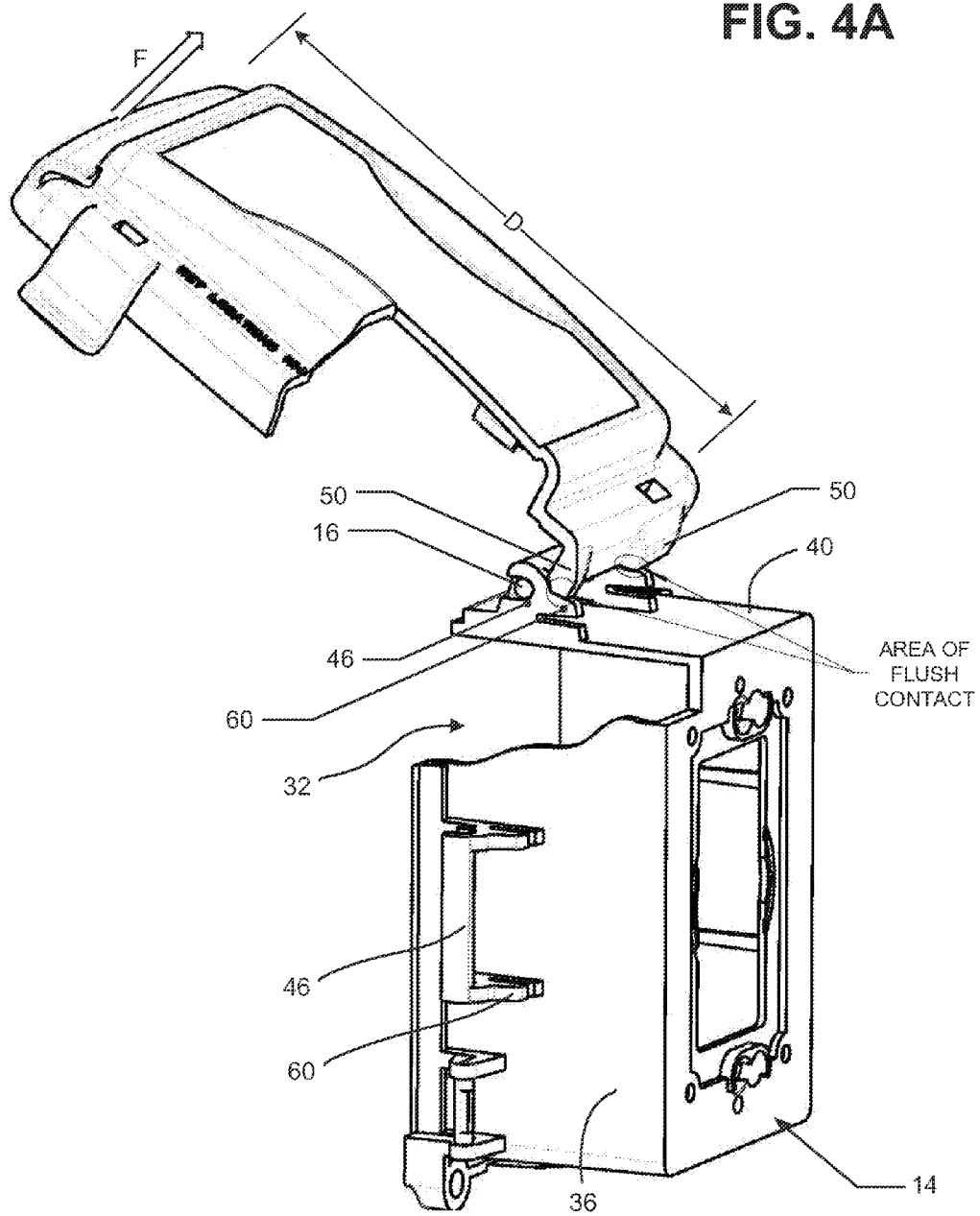
FIG. 4A provides a cutaway perspective view of the while-in-use cover of FIG. 1 in an open orientation.
Figure 4B:
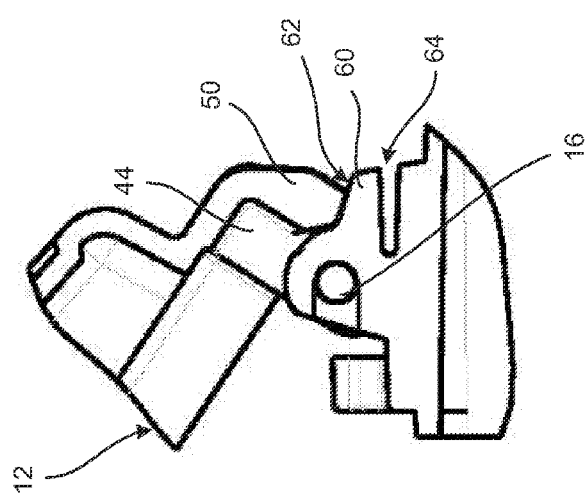
FIG. 4B provides an enlarged side view of the cutaway portion of FIG. 4A.

FIG. 4A provides a cutaway perspective view of electrical box cover 10 in an open orientation. FIG. 4B provides an enlarged side view of the cutaway view of FIG. 4A. As shown in FIG. 4A, a force, F, may be applied to a distal end of hood 12 to open hood 12. Referring collectively to FIGS. 4A and 4B, when hood 12 is fully opened, hood hinge mount 44 rotates around hinge pin 16 until contact surface 52 of load dispersing member 50 engages contact surface 62 of accepting member 60 on base 14. The mating of contact surface 52 with contact surface 62 may generally prevent further rotation of hood 12 past the point of engagement between the contact surface 52 and contact surface 62. Assuming the opening force F continues to be applied after contact surface 52 engages contact surface 62, a load may be applied to the area of hood hinge mounts 44 and base hinge mount 46. As described further herein, electrical box cover 10 may withstand a force, F, applied at a distance, D, from hinge mounts 44. In one implementation, force F and distance D may be tied to commercial or residential standards (e.g., NEC standards). For example, electrical box cover 10 may be configured to withstand a force, F, of 40 pounds applied at a distance, D, of about six inches. In another orientation (e.g., if electrical box cover 10 is hinged offside 36), force F may be applied at a different location of hood 12.

Contact surfaces 52 of load dispersing members 50 and contact surfaces 62 of accepting members 60 may disperse stress that would otherwise be applied almost exclusively to hood hinge mount 44 and base hinge mount 46. The angle of each contact surface 52 may be complimentary to the respective angle of each corresponding contact surface 62 to allow contact surface 52 and contact surface 62 to fully abut. In one implementation, the angle of contact surface 52 and contact surface 62 may be 45 degrees. In other implementations, the angle of contact surface 52 and contact surface 62 may be between about 30 and 60 degrees. Without the flush mating of contact surface 52 and contact surface 62, hood 12 could eventually contact accepting member 60 on essentially a knife-edge (e.g., a corner of edge 30), which would result in a severe stress concentration at the contact points. In implementations described herein, load dispersing members 50 and accepting member 60 may disperse the load to the surrounding areas of hood hinge mount 44 and base hinge mount 46 and/or other parts of hood 12 and cover plate 14 in order to prevent failure to the function of the hinges as well as hood 12 and cover plate 14. Use of the load dispersing members 50 and accepting members 60 allows for modification of a typical hinge design with minimal re-tooling for manufacturing. At the same time, use of load dispersing members 50 and accepting members 60 may accommodate the severe forces that would otherwise transfer to the hinge area of electrical box cover 10.

FIG. 5A provides a rear view of a section of hood 12 including load dispersing member 50 (e.g., from a perspective looking into the opening of hood 12). As shown in FIG. 5A, load dispersing member 50 may extend beyond edge 30 by a height, H. In one implementation, height H may be approximately equal to the thickness, T, of edge 30. In other implementations, different height to thickness ratios may be used. Load dispersing member 50 may extend for a width, $W_1$, that is approximately twice the width, $W_2$, of hood hinge mounts 44. In other implementations, different width ratios may be used. Hood hinge mounts 44 and load dispersing member 50 may or may not be centered with respect to width $W_1$ and width $W_2$.

FIG. 5B provides a side cross-sectional view of a section of hood 12 including load dispersing member 50. As shown in FIG. 5B, contact surface 52 of load dispersing member 50 may be set at an angle, A, from vertical. Contact surface 52 may be configured to engage flush with contact surface 62 of accepting member 60 when hood 12 is in the fully opened position (e.g., FIGS. 4A and 4B). The angle A, in conjunction with the orientation of contact surface 62, may permit hood 12 to be opened to substantially the same extent as a hood for a traditional while-in-use cover but providing a flush contact between contact surface 52 and contact surface 62. As shown in FIG. 5B, the height H of load dispersing member 50 may extend back from edge 30 for a distance, X. In one implementation, distance X may be constrained by the length of the dimensions of hood side walls 22, 24, 26, and 28 extending around the perimeter of front wall 20.

Referring collectively to FIGS. 5A and 5B, load dispersing member 50 may include tapering sides (e.g., beyond width $W_1$ and thickness T) to more evenly disperse loads applied to contact surface 52. For example, as shown in FIG. 5A, load dispersing member 50 may include tapering sides 66 on either side of load dispersing member 50. Tapering sides 66 may taper at an angle, such as 45 or 60 degree angle from edge 30. As shown in FIG. 5B, load dispersing member 50 may include another tapering side 68 substantially opposite contact surface 52. Tapering side 68 may taper at an angle, such as 45 or 60 degree angle from horizontal, to blend smoothly into front wall 20.

Although load dispersing member 50 has been described herein with respect to a height, width, and depth that suggest a rectangular cross section, in other implementations, load dispersing member 50 may include any variety of symmetrical or asymmetrical protrusions that may form contact surface 52 at edge 30.

FIGS. 1, 2, 3A, and 4A illustrate views of electrical box cover 10 being assembled in a vertical orientation. In another implementation, electrical box cover 10 may be assembled in a horizontal orientation. A horizontal orientation may include electrical box cover 10 being rotated ninety degrees and the hinge arrangement being changed to open from the new (e.g., after rotation) top side. In a horizontal orientation, load dispersing members 50 at side 22 of hood 12 and corresponding accepting members 60 on base hinge mount 46 of side 36 may function similarly to those described above with respect to the vertical orientation.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A while-in-use electrical box cover, comprising:
a base having a box-like structure with a rear opening for accessing an electrical outlet and an open front face, wherein the base further includes a base hinge mount;
a hood having a front wall for covering the open front face of the base, wherein the hood further includes a hood hinge mount;
a hinge pin inserted into the base hinge mount and the hood hinge mount to join the base and the hood in a pivotal configuration;
an accepting member extending from the base hinge mount, the accepting member including a first contact surface; and
a load dispersing member included on the hood, wherein the load dispersing member includes a second contact surface configured to engage the first contact surface when the hood pivots to a fully open position and to prevent rotation of the hood past a point of engagement between the first contact surface and the second contact surface,
wherein the first contact surface and the second contact surface are configured to engage in a flush orientation, and
wherein the base hinge mount, the hood hinge mount, and the hinge pin support a force of at least forty pounds, applied to a distal end of the hood, that holds the hood in the fully open position.

2. The electrical box cover of claim 1, wherein engagement of the first contact surface and the second contact surface creates a stress concentration in the hood, and wherein the load dispersing member disperses the stress concentration away from the hood hinge mount.

3. The electrical box cover of claim 1, wherein the load dispersing member includes one or more tapering sides.

4. The electrical box cover of claim 1, wherein the load dispersing member extends along an edge of the hood for a length that is greater than a width of the hood hinge mount.

5. The electrical box cover of claim 1, wherein the hood comprises a polycarbonate material.

6. The electrical box cover of claim 1, wherein the base comprises a polycarbonate material.

7. The electrical box cover of claim 1, wherein the hinge pin comprises a different material than that of the base and the hood.

8. The electrical box cover of claim 1, wherein a height of the load dispersing member is greater than or equal to a thickness of an edge of the hood.

9. The electrical box cover of claim 1, wherein the hood further comprises another load dispersing member on a second side of the hood.

10. The electrical box cover of claim 1, wherein the accepting member of the base hinge mount is configured to form a spring buffer to cushion an impact of the second contact surface on the first contact surface.

11. The electrical box cover of claim 1, wherein the load dispersing member includes a tapering side opposite the second contact surface.

12. A while-in-use electrical box cover, comprising:
a base having a box-like structure with a rear opening for accessing an electrical outlet and an open front face, wherein the base further includes a base hinge mount;
a hood having a front wall for covering the open front face of the base, wherein the hood further includes a hood hinge mount;
a hinge pin joining the base hinge mount and the hood hinge mount in a pivoting configuration;
an accepting member extending from the base hinge mount, the accepting member including a first contact surface; and
a load dispersing member included on the hood, wherein the load dispersing member includes a second contact surface configured to engage the first contact surface when the hood pivots to a fully open position,
wherein engagement of the first contact surface and the second contact surface creates a stress in the hood, and wherein the load dispersing member disperses the stress away from the hood hinge mount, and
wherein the base hinge mount, the hood hinge mount, and the hinge pin support a force of at least forty pounds, applied to a distal end of the hood, that holds the hood in the fully open position.

13. The electrical box cover of claim 12, wherein the first contact surface and the second contact surface are configured to engage in a flush orientation.

14. The electrical box cover of claim 12, wherein the base and the hood are configured to be arranged to open from a top side in either a first orientation or second orientation.

15. The electrical box cover of claim 12, wherein the load dispersing member extends along an edge of the hood for a length that is greater than a width of the base hinge mount.

16. The electrical box cover of claim 12, wherein a height of the second contact surface of the load dispersing member is greater than or equal to a thickness of an edge of the hood adjacent to the second contact surface.

17. The electrical box cover of claim 12, wherein the hood and the base each comprise a polycarbonate material.

18. The electrical box cover of claim 12, wherein the hood and the base each comprise a metal material.

19. The electrical box cover of claim 12, wherein the accepting member of the base hinge mount is configured to form a spring buffer to cushion an impact of the second contact surface on the first contact surface.

\* \* \* \* \*